United States Patent Office 3,405,260
Patented Oct. 8, 1968

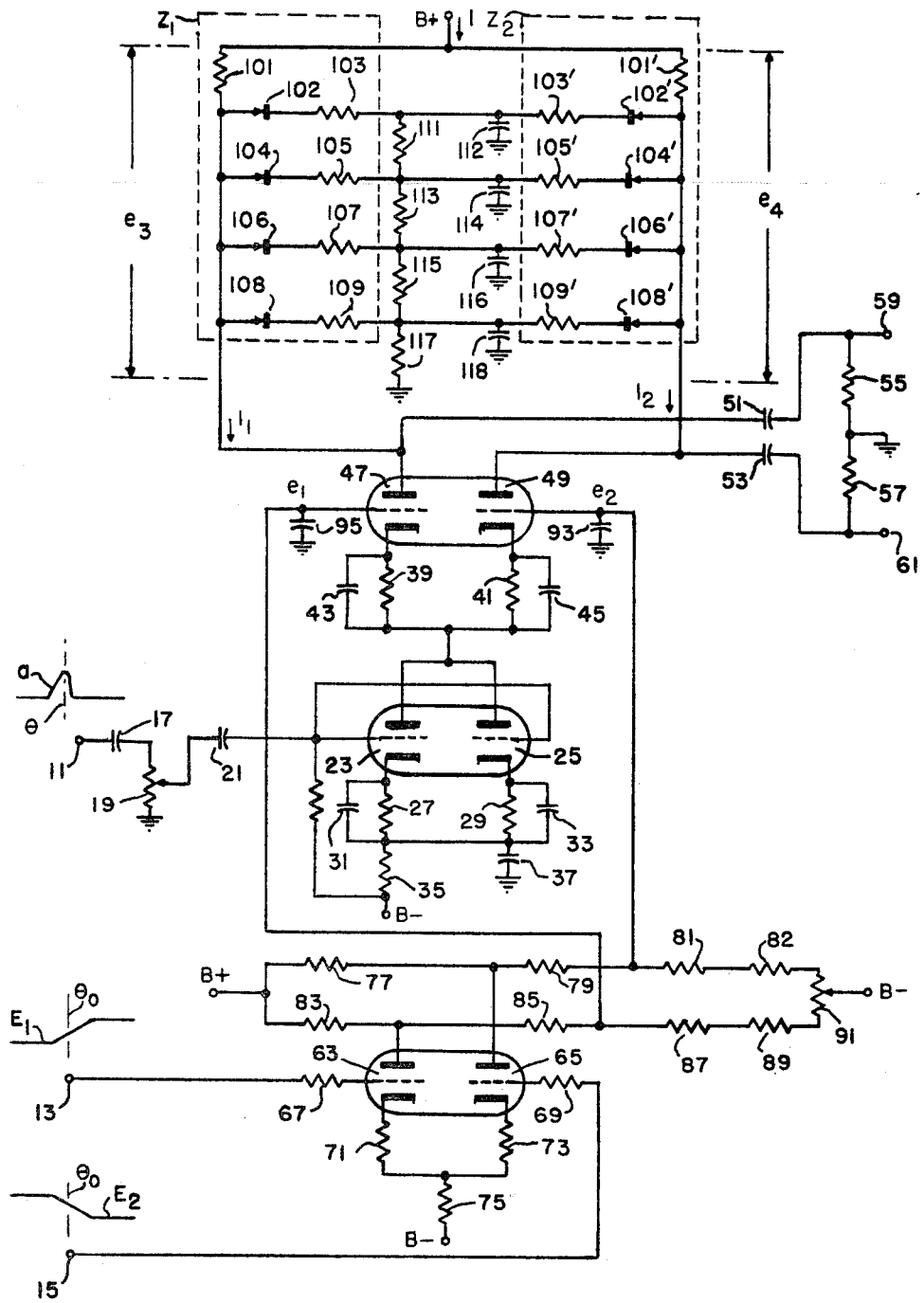

3,405,260
RADAR SIGNAL STRENGTH AND ERROR
MULTIPLIER CIRCUIT
Richard N. Close, Garden City, and Eugene W. Sard, Flushing, N.Y., assignors to the United States of America as represented by the Secretary of the Army
Filed July 8, 1955, Ser. No. 520,942
5 Claims. (Cl. 235—194)

The invention described herein relates generally to a novel multiplier circuit and, more particularly, to a signal strength times error multiplier circuit useful in a track-while-scan radar system.

In a track-while-scan radar system such as that disclosed in the application of Richard N. Close, Ser. No. 507,749 filed on May 9, 1955, now Patent No. 3,064,250, the tracking system measures the error existing between the actual position of the target being tracked, as determined from the reflected signals received therefrom, and the predicted position of the target as represented by the established system gates. It is desired to set up this existing error in terms of an analog voltage which can later be used in the computer section to correct the tracking operation of the system. This is broadly accomplished in the case of azimuth corrections by (1) multiplying a voltage representative of the error from the predicted position by the signal strength of the received signals, (2) integrating the resultant voltage thus obtained, (3) integrating the received reflected signals to obtain a measure of signal strength and (4) dividing the integrated signal strength times error voltage by the integrated signal strength voltage to obtain a measure of the error.

The system disclosed herein involves only the apparatus necessary to perform step (1) of the above operation that is the multiplication of a voltage representative of the magnitude of the observed error from the predicted position by the signal strength of the reflected signals.

The desired result is accomplished by the use of a differential amplifier circuit having matched non-linear resistors whose resistance is proportional to the current through them to produce a voltage proportional to signal strength times error.

It is an object of the present invention to provide a novel multiplier circuit operating on the differential amplifier principle.

It is a further object of the invention to provide a circuit capable of representing the product of the reflected signal strength times error from predicted position in a radar system as an analog voltage.

It is a still further object of the invention to provide a novel voltage multiplier circuit utilizing a differential amplifier operating with non-linear impedances to obtain the product of the signal strength of an input pulse and the relative displacement of said pulse from a reference time.

Other objects and many attendant advantages of the invention will become apparent from the following detailed description considered in conjunction with the accompanying drawing wherein:

The single figure is a schematic drawing of a form of circuit constructed in accordance with the principles of the invention.

Referring now to the single figure of the drawing, it will be noted that the system diagrammatically illustrated therein has three input terminals 11, 13 and 15. A first input voltage is applied to the input terminal 11. The first input voltage which may, for example, be a reflected video pulse whose duration is of the order of one microsecond. This voltage which may be obtained from the receiver of a radar system has a waveform of the type represented at $a$.

The voltage inputs to the input terminals 13 and 15 are similarly represented by waveforms $E_1$ and $E_2$ respectively. The waveforms $E_1$ and $E_2$ are sloping waveforms having slopes whose duration is of the order of 100 milliseconds which are numerically equal but in opposite directions. These waveforms have a crossover point, that is a point of equal magnitude at a point $\theta_0$ on the time axis which is representative of the predicted target azimuth. The particular circuit utilized to obtain these waveforms is specifically disclosed in the copending application of Warren D. White, Ser. No. 421,210 filed Apr. 5, 1954, now Patent No. 3,040,257 for "means for Generating Symmetrical Gate Voltage." Inasmuch as the details of this circuit form no part of the present invention they have not been included in this description. It is believed sufficient to state that the pulse of waveform $a$ may occur at an azimuth $\theta$ which may be before, at, or after the time of the crossover point $\theta_0$ and that the interval between the azimuth $\theta$ and $\theta_0$ is representative of the error in the observed azimuth of the target with respect to the predicted azimuth of the target.

The pulsed input to terminal 11 is applied through a coupling condenser 17, a voltage divider potentiometer 19 and a second coupling condenser 21 to the grids of a pair of electron discharge tubes 23 and 25 operating near cut-off illustrated as the two sections of a dual triode tube. The cathodes of the tubes 23 and 25 are connected through the resistors 27 and 29 shunted by by-pass condensers 31 and 33 respectively to one end of a resistor 35. The other end of resistor 35 is connected to the negative terminal of a source of voltage. The junction of resistor 35 and the resistors 27 and 29 is by-passed to ground through a condenser 37.

The anodes of tubes 23 and 25 are connected together and through resistors 39 and 41 by-passed respectively by condensers 43 and 45 connected to the cathodes of a second pair of electron tubes 47 and 49. The anodes of tubes 47 and 49 are connected through non-linear plate loads $Z_1$ and $Z_2$ respectively to a positive terminal of the source of supply voltage. The nonlinear plate loads $Z_1$ and $Z_2$ are enclosed in dotted lines for identification purposes and each includes as a part thereof the common resistor string and by-pass condensers shown physically located between the dotted line blocks indicating the load elements. The non-linear impedance elements are described in detail hereinafter.

The anodes of tubes 47 and 49 are coupled through condensers 51 and 53 to output terminals 59 and 61 respectively. The output terminals are connected by a pair of resistors 55 and 57 connected in series with their junction point tied to ground.

The sloping wave input voltages applied to the terminals 13 and 15 are applied respectively to the grids of a third pair of electron tubes 63 and 65 through current limiting resistors 67 and 69. The cathodes of the tubes 63 and 65 are connected together through resistors 71 and 73 and the junction point of resistors 71 and 73 is connected to the negative terminal of the source through a common resistor 75. The anodes of tubes 63 and 65 are connected to taps on similar voltage divider strings connected between the positive terminal and the negative terminal of the direct current source. The first voltage divider string is made up of resistors 77, 79, 81, 82 and the upper section of a potentiometer 91 with the anode of the tube 65 connected to the junction between resistors 77 and 79. The second voltage divider string is made up of resistors 83, 85, 87, 89 and the lower section of potentiometer 91 with the anode of tube 63 connected to the junction between resistors 83 and 85. Output taps are located at the junction between resistors 79 and 81 and between resistors 85 and 87. The first output tap is connected to the grid of tube 49 which has a by-pass condenser 93 from the grid to ground. The second output tap is similarly connected to the grid of tube 47 which has a by-pass condenser 95 connected from the grid to ground. The slider of potentiometer 91 connected to the negative terminal of the source may be adjusted to set the initial balance point of the system so that in the absence of any signal input to the tubes 63 and 65 the potential of the output taps will be equal.

The non-linear plate impedances $Z_1$ and $Z_2$ of tubes 47 and 49 will now be described. The corresponding elements of the impedance networks are identical and the elements thereof have been assigned similar reference characters. The elements of impedance unit $Z_2$ have primes attached thereto to designate their similarity to the corresponding elements of the impedance unit $Z_1$.

The anodes of tubes 47 and 49 are connected through resistors 101 and 101' to the positive terminal of the source. A shunt connection to ground is also connected to each anode and this connection is made up of a complex diode and resistor network. A series string of resistors 111, 113, 115 and 117 is connected at its lower end to ground. The upper end of the series resistor string and each junction between the resistors is connected to ground through a plurality of condensers 112, 114, 116 and 118 that serve to bypass these points to the video pulse. The series resistor string and the condensers are common to both impedance elements $Z_1$ and $Z_2$. The anode of tube 47 is connected to the upper end of the series resistor string through a diode 102 and a resistor 103 and also to the junctions between the resistors of the string by diodes 104, 106, 108 and resistors 105, 107 and 109. The anode of tube 49 is similarly connected to the same points on the resistor string through diodes 102', 104', 106', 108', and resistors 103', 105', 107' and 109'.

Each of the impedance elements $Z_1$ and $Z_2$ constitutes a non-linear resistive network whose overall resistance is approximately proportional to the current flow therethrough. The approximation has a broken line characteristic that becomes more exact as more diode sections are used.

The analysis of the non-linear circuit in a general way may be described somewhat as follows. With a light pulse current flow through tube 47 the voltage at the anode thereof is high. All of the diodes 102 through 108 are conductive and the multiple shunt resistance path therethrough to ground is low. This causes the effective resistance of the plate load $Z_1$ to be low. As the pulse current flow through tube 47 increases the anode voltage drops. Diode 102 having the highest direct-current voltage existing on its cathode element ceases to conduct removing resistor 103 from the shunt path to ground. This increases the effective resistance of $Z_1$. Further increases in current flow cause the diodes 104, 106 and 108 to successively become non-conducting and the overall result can be shown to be an impedance element which varies in resistance as the current flow therethrough.

The manner in which the circuit operates and an analysis thereof to show that the output voltages derived therefrom are proportional to the signal strength times error from predicted position of the target will now be set forth.

When a reflected video pulse $a$ is fed into the system it will be apparent that:

$$e_1 - e_2 = K_1(\theta - \theta_0) \quad (1)$$

where $e_1$ and $e_2$ are the voltages appearing on the grids of tubes 47 and 49 and are proportional to the instantaneous values of $E_1$ and $E_2$ at the time of arrival of the pulse, $\theta$ is the azimuth at the time of arrival of the particular pulse $a$, $\theta_0$ is the predicted azimuth of the pulse (i.e. the crossover point of sloping waves $E_1$ and $E_2$) and $K_1$ is a constant.

It will further be apparent that the total current through the differential amplifier caused by the pulse is:

$$I = K_2 a \quad (2)$$

where I is the total current, $a$ is the pulse amplitude and $K_2$ is a constant.

The total current I is made up of two components and:

$$I = I_1 + I_2 \quad (3)$$

where $I_1$ is the current through tube 47 and $I_2$ is the current through tube 49.

If the values of the cathode resistors 39 and 41 of the tubes 47 and 49 are chosen large with comparison to the reciprocal of the transconductance of the tubes then:

$$I_1 - I_2 = \frac{e_1 - e_2}{R_k} \quad (4)$$

where $R_k$ is the ohmic resistance of the cathode resistors 39 and 41.

The voltage across the non-linear plate impedances $Z_1$ and $Z_2$ will vary with the current flow therethrough and the instantaneous value of the resistance of the impedance element. Since, as has been pointed out above, the instantaneous value of resistance elements varies with the current therethrough then:

$$e_3 = K_4 + K_3(I_1)^2 \quad (5)$$

and $$e_4 = K_4 + K_3(I_2)^2 \quad (6)$$

where $e_3$ and $e_4$ are the voltages across non-linear impedance elements $Z_1$ and $Z_2$ respectively and $K_3$ and $K_4$ are constants.

The output voltage across the terminals 59 and 61 is proportional to the difference between $e_3$ and $e_4$ so subtracting Equation 6 from Equation 5:

$$e_3 - e_4 = K_3(I_1^2 - I_2^2) \quad (7)$$

Factoring Equation 7 it becomes:

$$e_3 - e_4 = K_3(I_1 + I_2)(I_1 - I_2) \quad (8)$$

Substituting for the various values contained in Equation 8 their identities from Equations 1, 2, 3, and 4 it becomes:

$$e_3 - e_4 = (K_1 K_2 K_3) a \frac{\theta - \theta_0}{R_k} \quad (9)$$

and combining all the constants of Equation 9 into a single constant $$K = \frac{K_1 K_2 K_3}{R_k}$$

the equation becomes:

$$e_3 - e_4 = K a(\theta - \theta_0) \quad (10)$$

The voltage relationship expressed in Equation 10 which is proportional to the output at terminals 59 and 61 is clearly proportional to the product of the amplitude of the input pulse $a$ and the target error from predicted position $\theta - \theta_0$.

A typical circuit which has been constructed in accordance with the principles outlined above contained the following circuit elements:

*Resistors and potentiometers*

| | | |
|---|---|---|
| 19 | ohms | 5,000 |
| 27, 20 | do | 2,000 |
| 35, 39, 41 | do | 10,000 |
| 55, 57 | do | 750,000 |
| 67, 69 | megohms | 2.2 |
| 71, 73 | ohms | 30,000 |
| 75 | do | 300,000 |
| 77, 83 | do | 200,000 |
| 79, 85 | megohms | 1 |
| 81, 87 | do | 1.5 |
| 82, 89 | ohms | 250,000 |
| 91 | do | 100,000 |
| 101, 101' | do | 4,300 |
| 103, 103' | do | 1,500 |
| 105, 105' | do | 5,100 |
| 107, 107' | do | 10,000 |
| 109, 109' | do | 18,000 |
| 111 | do | 1,800 |

*Resistors and potentiometers—Continued*

| | | |
|---|---|---|
| 113 | ohms | 1,300 |
| 115 | do | 1,200 |
| 117 | do | 25,500 |

*Condensers*

| | | |
|---|---|---|
| 17, 112, 114, 116, 118 | microfarad | 0.1 |
| 21 | do | 0.005 |
| 31, 33 | micromicrofarads | 30 |
| 37 | microfarad | 1.0 |
| 43, 45 | micromicrofarads | 25 |
| 51, 53 | microfarad | 0.001 |
| 93, 95 | micromicrofarads | 1,000 |

*Diodes.*—Type 1N47.

*Tubes*

| | |
|---|---|
| 23, 25 | Type 12AT7 |
| 47, 49 | Type 12AT7 |
| 63, 65 | Type 6SU7GTY |

It is to be understood, however, that the elements and values listed above are by way of example only and that the invention may be practiced other than with the particular elements and values given above.

It will be apparent that the arrangement described constitutes a differential amplifier having non-linear plate loads. The total current flow through the entire amplifier is controlled in accordance with the amplitude of a reflected radar pulse, while the distribution of the total current through the two halves of the amplifier is controlled in accordance with the time of arrival of the pulse with respect to the predicted time of arrival. The resultant output has been shown to be proportional to the product of amplitude of the received pulse and the magnitude of the error.

If an output voltage is desired which indicates an error in one direction by an overall positive swing of output voltage and an error in the opposite direction by a negative swing of output voltage a unity gain inverter can be inserted between one of the present output terminals and a final output terminal. This inverter system was used, for example, in the apparatus of the above-identified application of Richard N. Close.

It will be apparent to those skilled in the art that in the light of the above teachings the invention may be practiced other than as specifically disclosed herein. It is, therefore, to be understood that the scope of the invention is defined by the appended claims.

What is claimed is:

1. An electronic multiplying circuit comprising a differential amplifier having a first pair of electron discharge tubes with non-linear plate loads connected to one terminal of a supply source, means including a third electron discharge tube connecting the cathodes of said pair of electron discharge tubes to another terminal of said supply source and adapted to vary the total current flow through said first pair of electron discharge tubes in response to a pulse of signal input to a control element of said third electron discharge tube, and means including a second pair of electron discharge tubes adapted to vary the relative distribution of the anode current between the first pair of electron tubes in response to the relative phasing of the input to the third electron discharge tube with respect to a reference time.

2. An electronic multiplying circuit according to claim 1 wherein said second pair of electron tubes have their output circuits connected to control elements of said first pair of electron discharge tubes and timed voltage waves are applied to control elements of said second pair of discharge tubes to establish said reference time.

3. An electronic multiplying circuit according to claim 2 wherein said timed voltage waves have numerically equal but oppositely sloping voltage-time characteristics.

4. An electronic multiplying circuit comprising a differential amplifier including a first pair of electron discharge tubes with anodes adapted to be connected to a first terminal of a supply source through current responsive non-linear impedance elements, means including a third electron discharge tube adapted to connect the cathodes of said first pair of electron discharge tubes to another terminal of the supply source, means for applying a signal pulse to a control element of said third electron tube to thereby control the current flow through said differential amplifier and means for applying oppositely sloped voltage waves, of equal time duration and establishing a time reference point at the crossover point of said waves, to the control elements of said first pair of electron discharge tubes whereby the potential between the anodes of said first pair of tubes is proportional to the magnitude of the signal pulse to the control element of said third tube and its time relationship with respect to said time reference point.

5. An electronic multiplying circuit according to claim 4 wherein said non-linear impedance elements increase in impedance with an increase in current flow therethrough.

No references cited.

RODNEY D. BENNETT, *Primary Examiner.*

C. L. WHITHAN, *Assistant Examiner.*